United States Patent [19]

Tevelow

[11] 4,300,389
[45] Nov. 17, 1981

[54] SOFT RECOVERY METHOD FOR GUNFIRED SHELLS

[75] Inventor: Frank L. Tevelow, Rockville, Md.

[73] Assignee: The United States of America as represented by the Secretary of the Army, Washington, D.C.

[21] Appl. No.: 157,145

[22] Filed: Jun. 6, 1980

[51] Int. Cl.³ .............................................. G01L 5/14
[52] U.S. Cl. ..................................................... 73/167
[58] Field of Search ........................... 73/167, 432 SD

[56] References Cited

U.S. PATENT DOCUMENTS

| | | | |
|---|---|---|---|
| 2,813,422 | 11/1957 | Schuessler | 73/167 |
| 3,217,534 | 11/1965 | Bingham et al. | 73/167 |
| 3,218,849 | 11/1965 | Marvinney et al. | 73/167 |
| 3,314,286 | 4/1967 | Hickerson et al. | 73/167 |
| 3,396,971 | 8/1968 | Estep | 273/102 |
| 3,678,745 | 7/1972 | Teng | 73/167 |
| 3,940,981 | 3/1976 | Covey et al. | 73/167 |
| 4,002,064 | 1/1977 | Curchack | 73/167 |

Primary Examiner—Donald O. Woodiel
Attorney, Agent, or Firm—Nathan Edelberg; Robert P. Gibson; Saul Elbaum

[57] ABSTRACT

An apparatus and method for soft recovery of a projectile is disclosed. An element, at least a portion of which is deformable, is placed in the path of the projectile, whereby the projectile becomes embedded in the element upon impact therewith. Gravitational or aerodynamic forces are applied to the combined projectile and deformable element to decelerate the same thereby making recovery possible.

15 Claims, 2 Drawing Figures

SOFT RECOVERY METHOD FOR GUNFIRED SHELLS

RIGHTS OF THE GOVERNMENT

The invention described herein may be manufactured and used by or for the United States Government for governmental purposes without payment to me of any royalty thereon.

BACKGROUND OF THE INVENTION

It is often necessary, both for the reason of safety and for testing purposes, to recover a projectile in an intact form. Various methods and devices have been developed to accomplish this result. Most are rather complex, costly, and difficult to utilize. Additionally, some soft recovery techniques are suitable for laboratory use only.

Some methods of soft recovery for projectiles involve directing the projectile down a closed tubular member while developing high gaseous pressure in front of the moving projectile. The pressure decelerates the projectile whereby it may be recovered in an intact form. U.S. Pat. Nos. 3,678,745; 3,940,981 and 4,002,064 are examples of such a soft recovery technique. While such a method is effective, the prior art techniques of performing such a method generally required sophisticated and expensive equipment, and were generally not well suited to the recovery of standard projectiles fired from ordinary weapons.

Another soft recovery technique known in the art involves firing a projectile along a set of rails which are partially submerged in water. A specially configured nose attached to the projectile scoops up the water, thereby providing deceleration forces. This method is also only suited for laboratory use due to the fact that a controlled environment and specially adapted equipment must be provided in order to decelerate the projectile. Additionally, if the projectile being tested has a rifling band attached thereto, means must be provided for stripping this band from the projectile so that the projectile may be properly accommodated by the rails.

U.S. Pat. No. 3,314,286 discloses a projectile recovery device which is suitable for field use. The device of the patent comprises a ring-like attachment to be fitted to the end of a gun barrel. The attachment is so configured as to catch the rifling band of the projectile thereby becoming attached to the projectile in its flight. A cable and balloon or other drag-inducing object are secured to the ring-like fitting to provide deceleration forces for the projectile. Use of this device is very cumbersome as it is necessary to attach a very long drag line and balloon to the projectile recovery device.

It is therefore an object of this invention to overcome the above noted drawbacks in the prior art techniques and devices.

It is an object of this invention to provide a projectile soft recovery apparatus suitable for use in the field and in the laboratory.

It is still another object to provide a soft recovery system which is inexpensive, requiring no complex equipment or devices, and requiring no power input for the operation of the system.

It is a further object of this invention to provide a soft recovery system which is well suited for use with standard shells and projectiles, and which requires no modification to existing guns and artillery.

It is yet another object of this invention to provide a soft recovery system which imparts no damage to the projectile or the fuse attached thereto.

SUMMARY OF THE INVENTION

The system of the present invention comprises an object placed in the path of the projectile to be recovered. At least a portion of the object is deformable upon impact with the projectile. Upon deformation, the projectile becomes embedded or attached to the object without the projectile itself becoming deformed or damaged in any way. The projectile and object may then be easily decelerated by frictional or aerodynamic forces.

DESCRIPTION OF A PREFERRED EMBODIMENT

Figure 1:
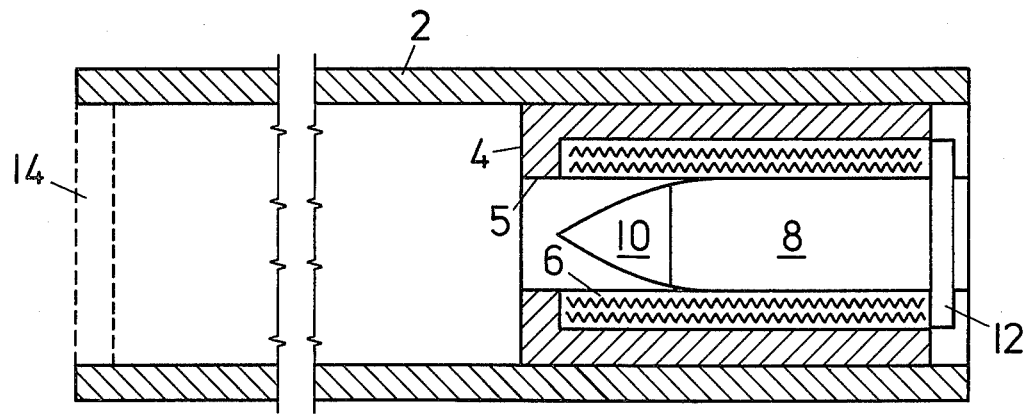
FIG. 1 illustrates an arrangement of elements which constitutes a preferred embodiment of the present invention.

FIG. 1 illustrates the essential components of the system of the present invention. Reference numeral 2 indicates an elongated tubular member which is adapted to decelerate the recovered projectile. Positioned within tube 2 are elements adapted to "catch" a projectile fired into the interior of the tube. Sleeve 4 is fitted within the tube and comprises an opening 5 of a dimension generally corresponding to the diameter of the projectile to be recovered. Mitigator 6 positioned within sleeve 4 cushions the initial impact of the projectile and assures that the initial deceleration thereof is gradual. The mitigator may be comprised of TUBE-CORE, a product of the Hexcel Corporation. TUBE-CORE comprises a tubular element composed of spirally wound corrugated sheet metal. As can be seen in FIG. 1, the interior diameter of the mitigator is approximately equal to the exterior dimension of projectile 8 to be captured therein. Projectile 8 comprises a fuse portion 10 and a rifling band 12 which cooperates with rifling grooves within the gun barrel (not shown) to impart spin to the projectile.

Sleeve 4 is composed of a solid material which may comprise a lubricant. An example of such a material is OILITE, bronze impregnated with oil. It is not essential that sleeve 4 comprise a lubricant, but the amount of lubricant present may be selectively adjusted to alter the performance of the apparatus. If one desires to decelerate the sleeve 4 and projectile 8 by means of frictional forces, it may be desirable to include little or no lubricant in the sleeve. This will result in relatively great frictional forces between sleeve 4 and tube 2, resulting in somewhat rapid deceleration of the projectile and sleeve 4. Alternatively, it may be desirable to decelerate the projectile by creating a zone of compressed air in its path, thereby creating resistance to movement of the projectile within the tube 2. To achieve such a result, it is necessary to close the end of the tube by means of cap 14 (shown in dashed lines) or similar means. When the apparatus is used in this manner, it is often desirable to provide greater lubrication between the sleeve 4 and the tube 2 in order to facilitate continued spin of the projectile, as will be discussed in greater detail below.

In operation, the tubular member 2 of the apparatus is placed in alignment with the muzzle of the gun which is to fire the projectile. The apparatus of the present invention is positioned in such manner that the projectile exiting from the gun will enter the center of the sleeve 4 and mitigator 6. Rifling band 12 is a standard part of many projectiles. During firing, the rifling band cooperates with spiral grooves in the gun barrel in order to impart spin to the projectile. The mitigator 6 is dimensioned such that the projectile 8 and fuse 10 enter the interior thereof while the rifling band 12 engages the end of the mitigator. FIG. 1 illustrates the relationship of the various elements described at the instant the projectile enters the mitigator and sleeve.

Figure 2:
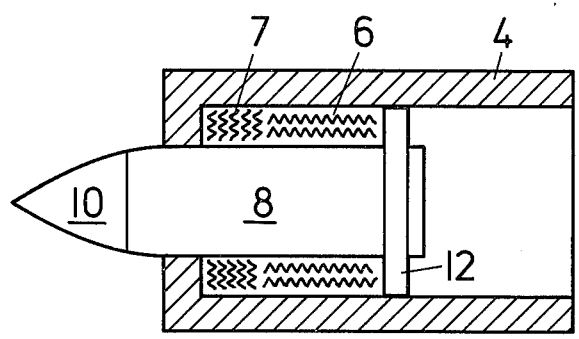
FIG. 2 illustrates the manner in which a projectile becomes lodged or embedded within the recovery means of the present invention.

As illustrated in FIG. 2, upon impact with the projectile and rifling band, the mitigator begins to collapse axially cushioning the impact of the projectile. As the mitigator collapses, the projectile 8 and fuse 10 will move axially relative to the sleeve 4, possibly protruding from opening 5 therein. The axial collapse of the mitigator, as depicted by portion 7 in FIG. 2, results in that portion of the mitigator exerting a radially inward clamping force on the projectile.

As the projectile becomes lodged within the mitigator 6 and sleeve 4, these elements begin to move as a unit axially along the interior of tube 2. Due to frictional interaction between sleeve 4 and tube 2, the sleeve and projectile are decelerated in a controlled fashion. As noted above, the degree of frictional interaction between the tube and the sleeve may be selectively controlled. The tube may be formed with sufficient length to totally decelerate the sleeve and projectile within such length. Alternatively, a somewhat shorter tube may be utilized whereby the sleeve and projectile are decelerated within the tube, exiting the tube at a reduced velocity into soft waste material or some other medium effective to stop the projectile.

As mentioned earlier, the device of the present invention may be modified in such manner that compressed air, rather than frictional forces, may be utilized to decelerate the projectile and sleeve. In such an embodiment, the distal end of the tube 2 is closed, for example, by means of an end cap 14, shown in dashed lines in FIG. 1. As the mitigator, sleeve and projectile proceed along the tube 2, the entire unit acts as a piston compressing the air in the tube and generating resistance to movement of the sleeve and projectile. The tube may be vented by holes spaced along the length thereof, the size and spacing of the holes determined by the desired deceleration profile.

In many instances, it is necessary for proper testing of the projectile or fuze that the spinning projectile continue to spin even during axial deceleration thereof. For example, such continued spin would be necessary to evaluate the performance of a centrifugal arming device. The closed tube embodiment of the present apparatus is particularly well suited for facilitating this continued spin of the projectile. If the sleeve 4 is dimensioned so as to fit somewhat loosely within tube 2, it will be free to rotate in response to the impact of the rotating projectile. As air within the tube is compressed by movement of the sleeve and projectile, compressed air will be forced into the gap between the sleeve 4 and the tube 2 thereby providing lubrication such as is provided in air bearings. This would readily facilitate continued spin of the projectile along with the mitigator 6 and the sleeve 4.

The apparatus of the present invention is extremely well suited for use in testing and evaluation of projectiles, fuses and related components. The structure of the present apparatus is such that no damage is inflicted upon the projectile or the associated fuse upon impact. The article to be tested is therefore recovered in perfectly intact condition.

In some instances, for the testing of certain safing and arming devices associated with projectile fuses, it is necessary that the projectile remain in free flight for a particular linear distance. Utilizing the present apparatus, this may be accomplished by linkage of the gun barrel and capture tube 2 through a guide rail system. The guide rail system may be relatively simple, as it is merely necessary to guide the projectile in such manner that it will be approximately centered relative to the mitigator upon entry into the recovery apparatus. Since the projectile will be somewhat self-centering upon entry into the mitigator 6 and sleeve 4, extremely precise alignment measures are obviated.

The apparatus and method of the present invention provides an inexpensive and reliable means for the soft recovery of standard projectiles. The device of the present invention is relatively simple to use and requires no modification to existing weapons and artillery. Because of the relatively simple structure of the present apparatus, malfunction is extremely unlikely. Also, Since no external power is required for its operation, the device of the present invention is readily adapted for use both in the laboratory and in the field.

While the invention has been described with respect to the accompanying drawings, I do not wish to be limited to the details disclosed therein as obvious modifications may be made by one of ordinary skill in the art.

I claim:

1. A method for soft recovery of a projectile comprising placing an object in the path of said projectile, said object being of such nature as to permit the projectile to become embedded therein upon impact, and decelerating said object with the projectile embedded therein.

2. A method as in claim 1, wherein said object is deformable in response to impact with said projectile.

3. A method as in claim 1, wherein said deceleration is accomplished by applying mechanical forces to said object.

4. A method as in claim 1, wherein said deceleration is accomplished by aerodynamic forces.

5. A method as in claim 1 or 4, wherein said projectile is rotating immediately prior to impact with said object, wherein said method comprises facilitating rotation of said object and projectile following impact and during deceleration.

6. A projectile soft recovery system comprising an object placed in the path of said projectile whereby said projectile becomes embedded in said object upon impact, and means to decelerate said object with the projectile embedded therein.

7. A system as in claim 6, wherein said object is deformable in response to impact with said projectile.

8. A system as in claim 7, wherein said object comprises a substantially rigid portion and a deformable portion which deforms upon impact with said projectile.

9. A system as in claim 7 or 8 wherein said object comprises a portion composed of corrugated material which deforms in response to impact with said projectile.

10. A system as in claim 6, wherein said deceleration means comprises means to apply frictional forces to said object.

11. A system as in claim 6, wherein said deceleration means comprises means to generate a region of elevated fluid pressure in the path of said object.

12. A system as in claim 8, wherein said deceleration means comprises means to apply frictional forces to the rigid portion of said object.

13. A system as in claim 6 or 11, which comprises means to facilitate rotation of said object with said projectile embedded therein during the deceleration of said object.

14. A system as in claim 13, wherein said means to facilitate rotation of said object during deceleration thereof comprises a guide means for determining the path of the object during the deceleration, said object and guide means being configured and dimensioned to provide a gap therebetween for passage of a lubricating flow of fluid to facilitate rotational movement of said object relative to said guide means.

15. A system as in claim 8 or 12, wherein said rigid portion comprises a solid material containing a lubricant.

* * * * *